Jan. 26, 1926. 1,570,685

C. E. LARRABEE

TIME CONTROLLED DEVICE FOR DAMPERS, VALVES, AND THE LIKE

Original Filed August 7, 1924    2 Sheets-Sheet 1

Inventor
Clinton E. Larrabee
By his Attorneys
Cooper, Kerr & Dunham

Jan. 26, 1926. 1,570,685
C. E. LARRABEE
TIME CONTROLLED DEVICE FOR DAMPERS, VALVES, AND THE LIKE
Original Filed August 7, 1924   2 Sheets-Sheet 2

Inventor
Clinton E. Larrabee
By his Attorneys
Cooper, Kerr & Dunham

Patented Jan. 26, 1926.

1,570,685

UNITED STATES PATENT OFFICE.

CLINTON E. LARRABEE, OF BINGHAMTON, NEW YORK, ASSIGNOR TO INTERNATIONAL TIME RECORDING COMPANY OF NEW YORK, OF ENDICOTT, NEW YORK, A CORPORATION OF NEW YORK.

TIME-CONTROLLED DEVICE FOR DAMPERS, VALVES, AND THE LIKE.

Application filed August 7, 1924, Serial No. 730,595. Renewed December 8, 1925.

*To all whom it may concern:*

Be it known that I, CLINTON E. LARRABEE, a citizen of the United States of America, residing at Binghamton, in the county of Broome and State of New York, have invented certain new and useful Improvements in Time-Controlled Devices for Dampers, Valves, and the like, of which the following is a full, clear, and exact description.

This invention relates to time controlling apparatus for dampers, valves, and the like. It is more particularly directed to the provision of a means for operating a valve or damper to differential extents at various times. The device may be arranged to successively move a damper step-by-step, and if desired the damper controlling member may be arranged to partially open to a desired extent, then remain in such position for a predetermined time, and afterwards be further displaced as desired. Previous time controlled devices have been provided for controlling dampers and the like, but these have been arranged to entirely open the damper at a given time, or entirely close it.

Further objects of the invention reside in the provision of certain details of construction whereby a controlling element may be easily displaced without imposing undue strain upon the clock mechanism.

Other objects reside in the provision of a device of this nature which will be simple and inexpensive to manufacture, and which will not get out of order when in use.

Referring to the drawings—

Figure 2:
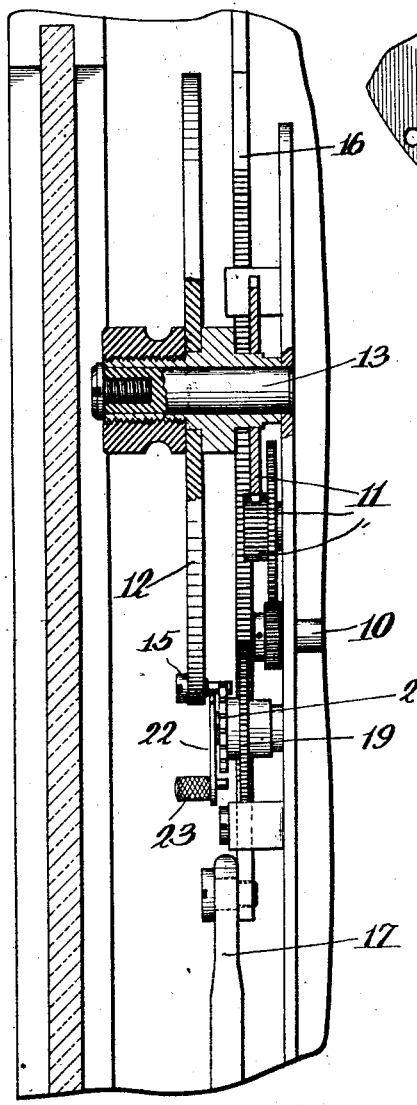
Fig. 2 is a side elevation partly in section.

In more detail, in Fig. 2, 10 designates a time driven arbor which may be connected in any suitable manner with the clock mechanism. This arbor, through gearing 11, is adapted to drive a time program wheel 12, which is rotatably mounted upon the stud 13, suitably fixed in fixed frame members of the device. The program disk or wheel 12 is of the customary type used in program clocks, and adjacent its periphery is provided with a plurality of threaded apertures 14 adapted to receive screw-threaded plugs 15. These plugs 15 are inserted at the points where shifting of the damper controlling member is desired. A convenient arrangement of plugs is to dispose them at 15 minute intervals upon the periphery of the program disk.

Slidably mounted in suitable brackets in the machine is a rack 16 which at its upper end may connect to any suitable damper or valve which is to be controlled. Hereinafter, in the claims, the rack 16 will be termed the controlling device.

Preferably, to actuate the damper, a weight 17 is provided which is connected to the lower end of the controlling device 16. Throughout a substantial portion of the length of the controlling device 16, rack teeth 18 are provided, which rack teeth mesh with a gear 19. At the upper end the rack teeth 18 are cut away, as shown at 20, for a purpose which will hereinafter be described. The gear 19 is suitably mounted for rotation, and has fixed thereto a Geneva disk 21. This Geneva disk is so located that its notches are adapted to cooperate with the plugs 15, which are carried by the program disk 12. Also cooperating with the Geneva disk 21 is an escapement 22 of any desired form. For the purpose of adjusting the escapement member 22 by hand, a knurled knob or handle 23 is provided, which may be manipulated to vibrate the escapement and permit the Geneva disk to operate under the influence of weight 17 when the Geneva disk is clear of the plugs 15.

*Operation.*

Figure 1:
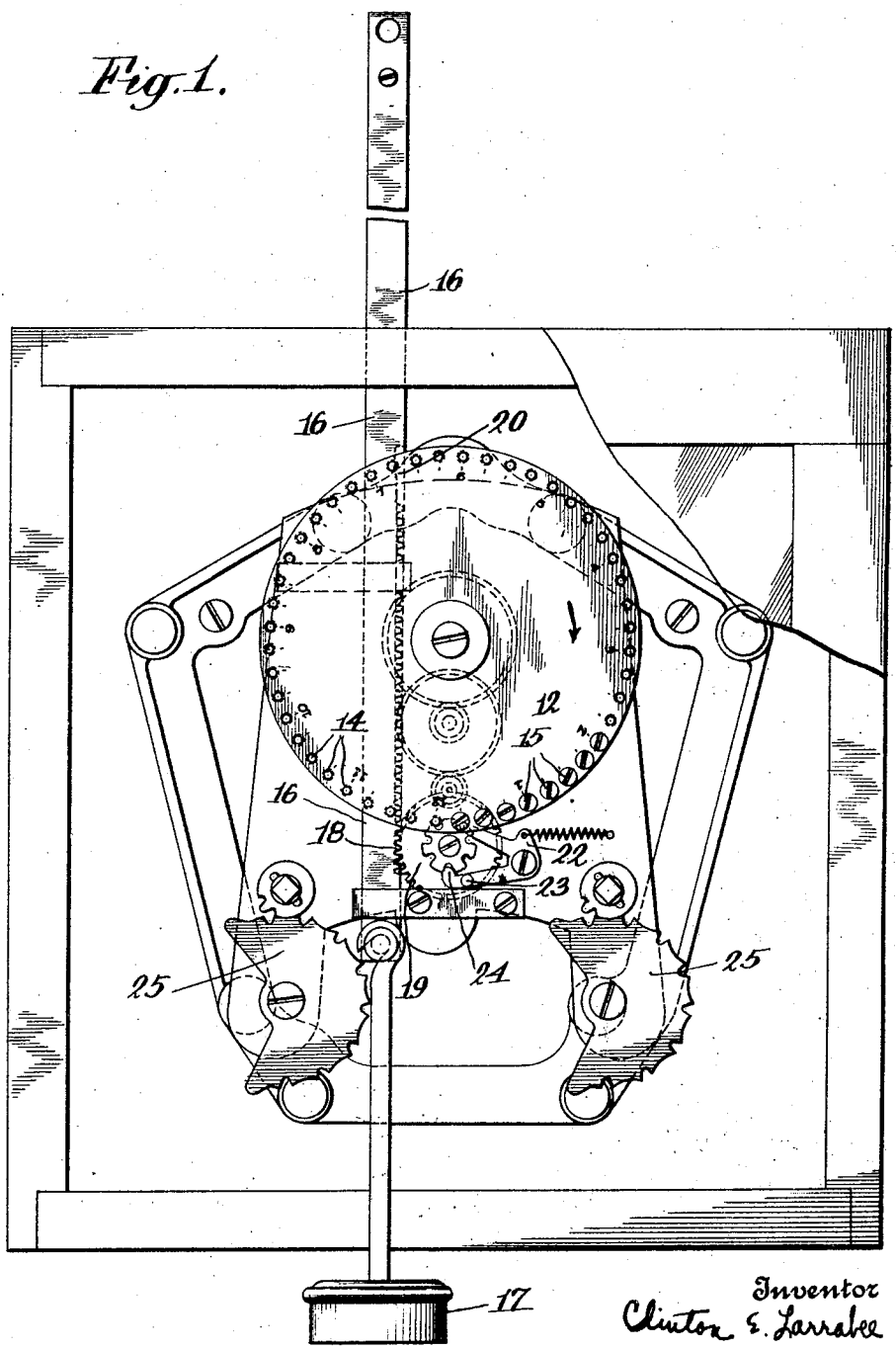
Fig. 1 is a front view of the apparatus.
Figure 3:
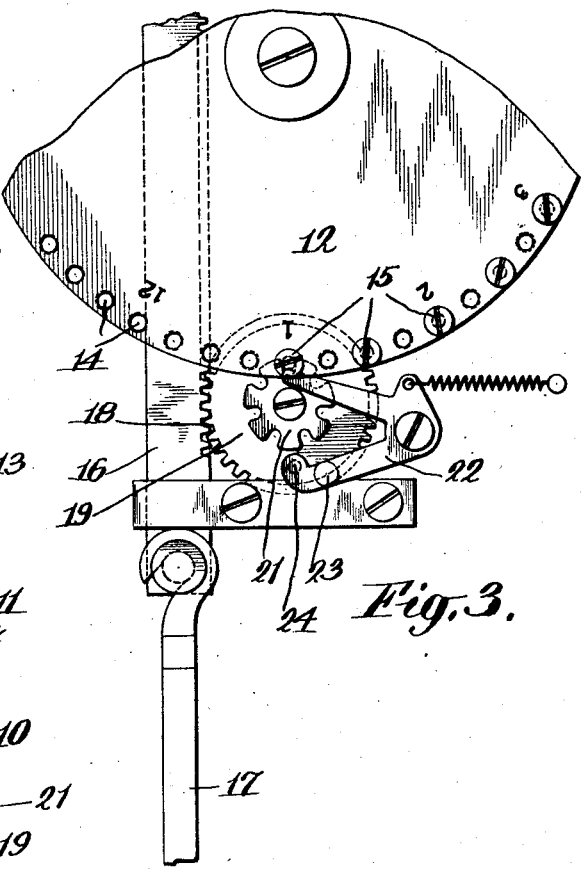
Fig. 3 is an enlarged front view of the escapement mechanism.

During such periods when plugs 15 are not in cooperation with the notches of the Geneva device, the lower end 24 of the escapement cooperates with the Geneva notches and prevents rotation of the Geneva and downward movement of the damper controlling member 16 under the influence of weight 17. As the program disk 12 rotates in the direction of the arrow, one or another of the stops 15 encounters the escapement device 22 and displaces it from the position shown in Fig. 1 to that shown in Fig. 3. Concurrently with this displacement the shank of the plug 15 enters the Geneva stop and thus prevents the damper controlling member from moving down without control. The program disk continues its advance, permitting the Geneva member 21 to turn and allowing the damper controlling member to descend one step. After the stop passes the Geneva, the part 24 of the escapement member 22 again locks the Geneva. If, however, another plug 15 is encountered, the damper controlling member is permitted to move to an additional extent.

The parts marked 25 on the drawings merely constitute the winding mechanism for the clock.

After the damper controlling member 16 has moved to its extreme position, the cutaway portion of the rack 20 comes into cooperation with the gear 18, and thereafter gear 18 is free to revolve without having any effect upon the damper controlling member.

To reset the parts, the escapement 22—24 is depressed by hand, and the damper controlling member 16 is then elevated to extreme elevated position. After it is thus reset, the escapement is released to prevent the subsequent descent of the damper controlling member except under the control of the clock mechanism. It will be understood that resetting may be effected at any time when desired.

I claim:

1. A time controlled apparatus for dampers, valves and the like, comprising a controlling member, a pre-positioned program wheel, and means for controlling the former member from said wheel to permit a differential displacement of said member, said means including a Geneva device controlled by the program wheel, geared connection therefrom to said controlling member, and an escapement device controlled by said program wheel for preventing movement of said controlling member at times when the Geneva device is out of cooperation with the program wheel.

2. A time-controlled apparatus for dampers, valves and the like including in combination a controlling member, a time positioned program wheel, means for controlling said controlling member from said program wheel, said means including a Geneva device and insertible means cooperating with said Geneva device and adapted to be variously inserted in said program wheel to effect the displacement of said controlling member at selected times.

3. A time controlled apparatus for dampers, valves and the like comprising in combination with a damper controlling member, a time positioned program wheel, an escapement mechanism controlled thereby, means controlled by said escapement mechanism for locking the damper controlling member at predetermined timed positions of the program wheel and unlocking the same at other positions thereof and means for maintaining the damper controlling member under the control of the program wheel during the movement of said member to thereby allow time for the escapement mechanism to move to a position in which relocking may be effected.

4. A time controlled apparatus for dampers and the like, comprising in combination with a controlling member, a program wheel, a combined escapement mechanism and drive controlling device for the controlling member, said devices having provisions for controlling and effecting a concurrent and coordinated movement of the drive controlling member with respect to the movement of the program wheel, and insertable means upon said program wheel for releasing said escapement and drive controlling device at selected time periods depending upon the position of the insertable means and the time position of the program wheel.

5. A time-controlled apparatus for dampers, valves and the like comprising a controlling member, a Geneva device geared thereto, a program wheel having insertible means for controlling the movement of said Geneva device and therethrough controlling the movement of said controlling member.

6. A time-controlled apparatus for dampers, valves and the like comprising a controlling member, a Geneva device geared thereto, a program wheel for controlling the movement of said controlling member, and means for effecting a disconnection between the Geneva device and the controlling member after the latter has moved to a determined position.

7. A time-controlled apparatus for dampers, valves and the like comprising a controlling member, a Geneva device geared thereto a program wheel for controlling the movement of said controlling member, and means for retaining the Geneva device in position when the latter is free from control by the program wheel.

8. A time-controlled apparatus for dampers, valves and the like comprising a controlling member, a Geneva device geared thereto, a program wheel for controlling the movement of said controlling member, means for retaining the Geneva device in position when the same is free from control by the program wheel, and means for releasing said last mentioned means for the purpose described.

9. A time-controlled apparatus for dampers, valves and the like including in combination a controlling member, a time positioned program wheel, means for controlling the time of movement and the extent of movement of said controlling member from said program wheel, said means including an escapement controlled in its operation by said program wheel, said means also including insertible devices in said program wheel for controlling the time of operation of said escapement.

10. A time controlled apparatus for dampers, valves and the like comprising in combination with a damper controlling member, a time positioned program wheel, an escapement mechanism controlled thereby, means controlled by said escapement mechanism for locking the damper controlling member at predetermined time positions of the program wheel and unlocking the same at other positions thereof, and means for positively timing the relocking action of the escapement with respect to the advancing movement of the damper controlling member to insure relocking of the same at the next position in which locking is to be effected.

In testimony whereof I hereto affix my signature.

CLINTON E. LARRABEE.